United States Patent
Chen et al.

(10) Patent No.: US 12,344,695 B2
(45) Date of Patent: Jul. 1, 2025

(54) POLYMERIZATION OF ETHYLENE IN SOLUTION PROCESSES USING A ZIEGLER-NATTA CATALYST AND A HYDROGENATION CATALYST

(71) Applicant: Dow Global Technologies LLC, Midland, MI (US)

(72) Inventors: Linfeng Chen, Beijing (CN); Andrew T. Heitsch, Angleton, TX (US); Jeffrey A. Sims, Lake Jackson, TX (US); David M. Pearson, Lake Jackson, TX (US); Kurt F. Hirsekorn, Sugarland, TX (US)

(73) Assignee: Dow Global Technologies LLC, Midland, MI (US)

( * ) Notice: Subject to any disclaimer, the term of this patent is extended or adjusted under 35 U.S.C. 154(b) by 309 days.

(21) Appl. No.: 17/630,791

(22) PCT Filed: Jul. 28, 2020

(86) PCT No.: PCT/US2020/043849
§ 371 (c)(1),
(2) Date: Jan. 27, 2022

(87) PCT Pub. No.: WO2021/021792
PCT Pub. Date: Feb. 4, 2021

(65) Prior Publication Data
US 2022/0275114 A1    Sep. 1, 2022

Related U.S. Application Data

(60) Provisional application No. 62/881,004, filed on Jul. 31, 2019.

(51) Int. Cl.
*C08F 4/655* (2006.01)
*C08F 2/04* (2006.01)
(Continued)

(52) U.S. Cl.
CPC ............ *C08F 4/65922* (2013.01); *C08F 2/04* (2013.01); *C08F 4/6555* (2013.01); *C08F 4/65912* (2013.01); *C08F 10/02* (2013.01)

(58) Field of Classification Search
CPC ................................ C08F 4/655; C08F 4/659
See application file for complete search history.

(56) References Cited

U.S. PATENT DOCUMENTS 5,739,220 A * 4/1998 Shamshoum ............ C08F 8/04
526/943
6,291,601 B1    9/2001 Debras
(Continued)

FOREIGN PATENT DOCUMENTS

CN        1275578 A  * 12/2000
CN        1292389 A  *  4/2001
(Continued)

OTHER PUBLICATIONS

Soga, K.; Shiono, T. Makromol. Chem., Rapid Commun. 1986, 7, 719-723. (Year: 1986).*
Soga, K.; Terano, M.; Ikeda, S. Polymer Bulletin, 1979, 1, 849-856. (Year: 1979).*
(Continued)

*Primary Examiner* — Rip A Lee
(74) *Attorney, Agent, or Firm* — Dinsmore & Shohl LLP

(57) ABSTRACT

The catalyst system includes a heterogeneous procatalyst and a hydrogenation procatalyst. The heterogeneous procatalyst includes a titanium species, an aluminum species, and a magnesium chloride component. The hydrogenation procatalyst has the formula $Cp_2TiX_2$, In formula $Cp_2TiX_2$, each Cp is a cyclopentadienyl substituted with at least one $R^1$, wherein $R^1$ is $(C_1-C_{10})$alkyl; and each X is independently a halogen atom.

15 Claims, 1 Drawing Sheet

(51) Int. Cl.
  *C08F 4/659* (2006.01)
  *C08F 4/6592* (2006.01)
  *C08F 10/02* (2006.01)

(56) References Cited

U.S. PATENT DOCUMENTS

| | | | |
|---|---|---|---|
| 6,653,254 B1* | 11/2003 | Shamshoum | C08F 110/02 |
| | | | 502/115 |
| 7,348,383 B2* | 3/2008 | Zoeckler | C08F 210/16 |
| | | | 502/103 |
| 9,045,569 B2 | 6/2015 | Jensen et al. | |
| 9,403,921 B2 | 8/2016 | Bhandarkar et al. | |
| 9,556,288 B2 | 1/2017 | Bhandarkar et al. | |
| 10,544,237 B2* | 1/2020 | Bauch | C08F 210/16 |
| 10,934,372 B2* | 3/2021 | Bauch | C08F 10/06 |
| 2010/0036068 A1 | 2/2010 | Aso et al. | |
| 2010/0036076 A1 | 2/2010 | Aso et al. | |
| 2017/0114199 A1 | 4/2017 | Yang et al. | |
| 2022/0306772 A1* | 9/2022 | Chen | C08F 4/6192 |

FOREIGN PATENT DOCUMENTS

| | | |
|---|---|---|
| EP | 0260130 A1 | 3/1998 |
| EP | 2913348 A1 | 2/2015 |
| EP | 2448977 B1 | 8/2015 |
| WO | 2017034722 A1 | 3/2017 |

OTHER PUBLICATIONS

Soga et al. "Stereospecific polymerization of propene using MgCl2-supported Ti catalysts combined with (RCp) 2TiMe2 (R=H, Me)" Makromol. Chem., Rapid Commun. 7, 719-723 (1986), 5 pgs.

Soga et al. "Stereospecific polymerization of propene using MgCl2-supported Ti catalysts combined with various alkyl titanium compounds" Makromol. Chem., Rapid Commun. 8, 273-276 (1987), 4 pgs.

International Search Report and Written Opinion dated Oct. 21, 2020, pertaining to Int'l Appl. No. PCT/US2020/03849 filed Jul. 28, 2020, 15 pgs.

Chinese Office Action dated Sep. 29, 2023, pertaining to CN Patent Application No. 202080052517.9, 27 pgs.

Brazil Office Action dated Oct. 24, 2023, pertaining to BR Patent Application No. BR112022001228-4, 4 pgs.

* cited by examiner

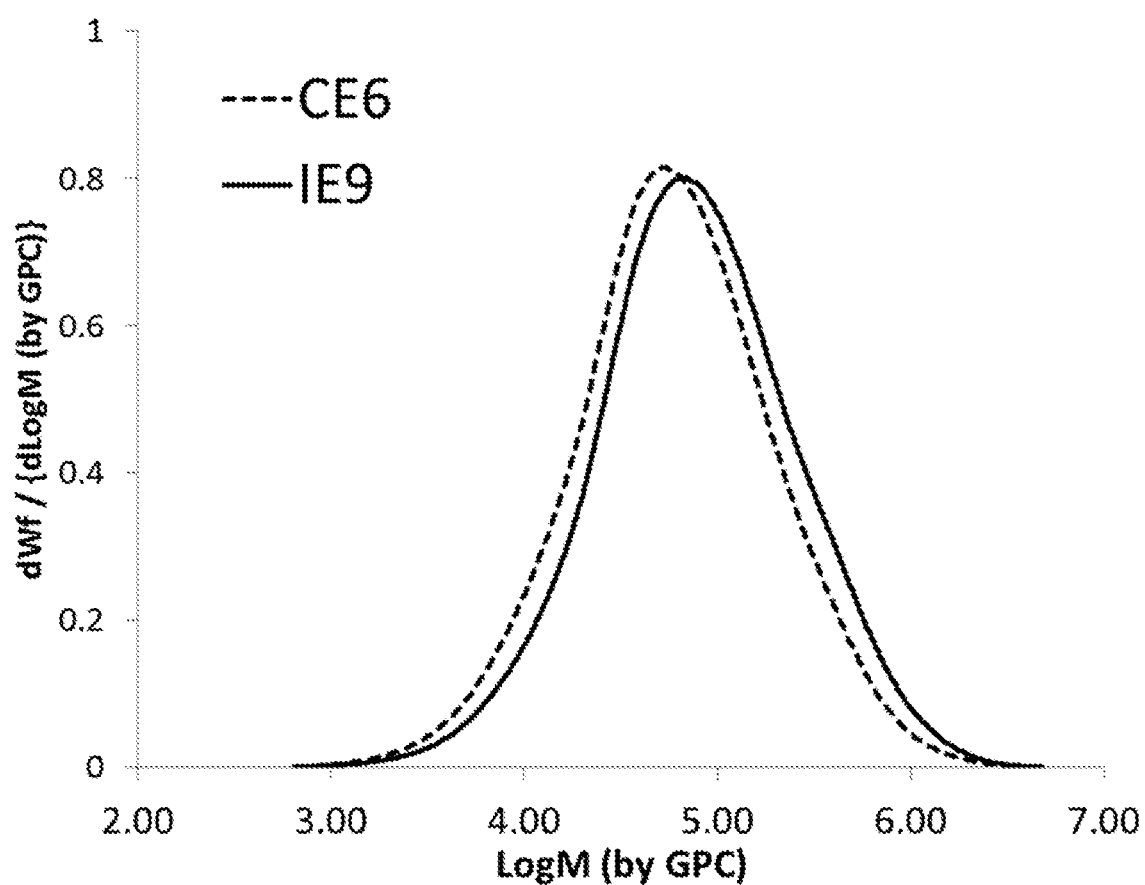

POLYMERIZATION OF ETHYLENE IN SOLUTION PROCESSES USING A ZIEGLER-NATTA CATALYST AND A HYDROGENATION CATALYST

CROSS-REFERENCE TO RELATED APPLICATIONS

This application is a National Stage Entry under 35 U.S.C. § 371 of International Patent Application No. PCT/US2020/043849, filed Jul. 28, 2020, which claims priority to U.S. Provisional Patent Application No. 62/881,004, filed on Jul. 31, 2019, the entire disclosures of both of which are hereby incorporated by reference.

TECHNICAL FIELD

Embodiments of the present disclosure generally relate to catalyst compositions for polymerizing ethylene and optionally one or more α-olefins, and the polymerization processes that utilize such catalyst compositions.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers and propylene-based polymers are manufactured for a wide variety of articles. The polyethylene and polypropylene polymerization processes can be varied in a number of respects to produce a wide variety of resultant polyethylene resins having different physical properties that render the various resins suitable for use in different applications. The ethylene monomers and optionally one or more co-monomers are present in liquid diluents (such as solvents), such as an alkane or isoalkane, for example isobutene. Hydrogen may also be added to the reactor. The catalyst systems for producing ethylene-based polymers may typically comprise a chromium-based catalyst system, a Ziegler-Natta catalyst system, and/or a molecular (either metallocene or non-metallocene) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced.

Titanocene hydrogenation catalysts have been used in (1) metallocene-catalyzed polymerization reactions, for removing $H_2$ generated by the metallocene polymerization catalysts; and (2) in one reactor of a linked reactor system, for removing $H_2$ carried over from a prior reactor. However, these applications of the titanocene catalysts for removing $H_2$ are limited to gas-phase and slurry-phase polymerization reactions in which reaction temperatures typically range from 60° C. to 120° C.

SUMMARY

There is an ongoing need to create catalyst systems or procatalysts that produce high molecular weight polymers at high polymerization temperatures (temperatures from 120° C. to 250° C.). Additionally, the catalyst system should have high efficiency, high reactivity, and ability to produce polymers with a high molecular weight (greater than 100,000 g/mol).

Embodiments of this disclosure include catalyst systems. The catalyst system includes a heterogeneous procatalyst and a hydrogenation procatalyst. The heterogeneous procatalyst includes a titanium species, an aluminum species, and a magnesium chloride component. The hydrogenation procatalyst has the formula $Cp_2TiX_2$. In formula $Cp_2TiX_2$, each Cp is a cyclopentadienyl substituted with at least one $R^1$, wherein $R^1$ is $(C_1-C_{10})$alkyl; and each X is independently a halogen atom.

Embodiments of this disclosure includes polymerize preprocess. The polymerization process for producing polyolefin polymers includes reacting $(C_2-C_{12})$α-olefins in solution in the presence of a catalyst system of this disclosure.

BRIEF DESCRIPTIONS OF THE FIGURES

The FIGURE is a graph of the gel permeation chromatography.

DETAILED DESCRIPTION

Embodiments of this disclosure include catalyst systems. The catalyst system includes a heterogeneous procatalyst and a hydrogenation procatalyst. The heterogeneous procatalyst includes a titanium species, an aluminum species, and a magnesium chloride component. The hydrogenation procatalyst has the formula $Cp_2TiX_2$. In formula $Cp_2TiX_2$, each Cp is a cyclopentadienyl substituted with at least one $R^1$, wherein $R^1$ is $(C_1-C_{10})$alkyl; and each X is independently a halogen atom.

In embodiments of the catalyst system, the heterogeneous procatalyst includes a titanium species. In some embodiments, the titanium species of the heterogeneous procatalyst may have catalytic activity. In some embodiments, the titanium species may include $TiCl_{4-c}(OR)_c$ or $TiCl_{3-d}(OR)_d$, wherein R is $(C_1-C_{20})$hydrocarbyl, subscript c is 0, 1, 2, 3, or 4, and subscript d is 0, 1, 2, or 3. In some embodiments, the titanium species may include, for example, titanium (IV) tetrachloride, titanium (III) trichloride, tris(2,2,6,6-tetramethyl-3,5-heptanedionato)titanium(III), trichlorotris(tetrahydrofuran) titanium(III), di-n-butoxytitanium(IV) dichloride, diethoxytitanium(IV) dichloride, diisopropoxytitanium(IV) dichloride, diisobutoxytitanium(IV) dichloride, triisopropoxytitanium(IV) chloride, tri-n-butoxytitanium(IV) chloride, triisobutoxytitanium(IV) chloride, titanium(IV) tetraisopropoxide $(Ti(O^iPr)_4)$, titanium(IV) ethoxide, titanium(IV) n-butoxide, titanium(IV) isobutoxide, titanium(IV) 2-ethylhexoxide, dichlorobis(2,2,6,6-tetramethyl-3,5-heptanedionato)titanium(IV), tetrachlorobis(tetrahydrofuran) titanium(IV), methyltitanium (IV) trichloride, or combinations thereof. In some embodiments, the titanium species may be titanium (IV) tetrachloride or titanium(IV) tetraisopropoxide $(Ti(O^iPr)_4)$. For example, in some embodiments, the titanium species may include a titanium halide, a titanium alkoxide, or combinations thereof. For example, in some embodiments, the titanium species may include, but is not limited to, titanium tetrachloride (TiCl$_4$), titanium(IV) tetraisopropoxide (Ti(O$^i$Pr)$_4$), other titanium halide or titanium alkoxide, or combinations of these.

In embodiments of the catalyst system, the heterogeneous procatalyst includes an aluminum species. In one or more embodiments, the aluminum species is chosen from trialkylaluminum, dialkylaluminum chloride, alkylaluminum dichloride, alkylaluminum alkoxide, and alkylaluminoxane.

In embodiments of the catalyst system, the heterogeneous procatalyst includes a magnesium chloride component. In one or more embodiments of the catalyst system, the magnesium chloride component of the heterogeneous catalyst has a surface area of greater than or equal to 100 m$^2$/g as measured according to the BET method. In some embodiments, the magnesium chloride component has a surface area of greater than or equal to 150 m$^2$/g, or greater than or equal to 200 m$^2$/g. In other embodiments, the magnesium chloride component has a surface area of from 100 m$^2$/g to 800 m$^2$/g, or 200 m$^2$/g to 600 m$^2$/g, or from 300 m$^2$/g to 500 m$^2$/g.

In one or more embodiments, the magnesium chloride includes a high surface area which can be obtained from chlorination of magnesium compounds. Such magnesium compounds include organomagnesium, organomagnesium halide, magnesium alkoxide, carbonated magnesium alkoxide, magnesium carboxylate, and combinations thereof. In embodiments, magnesium chloride may be obtained from conversion of magnesium chloride adducts. Suitable magnesium chloride adducts include magnesium chloride adducts with alcohols and magnesium chloride adducts with ethers. In some embodiments, the magnesium chloride adducts are magnesium chloride adducts with ethanol. In some embodiments, the magnesium chloride adducts are magnesium chloride adducts with tetrahydrofuran.

In one or more embodiments, the magnesium chloride components include, for example, the reaction product of a chloride source with a hydrocarbon soluble hydrocarbylmagnesium compound or mixture of compounds. Exemplary organomagnesium compounds include di(C$_1$-C$_{20}$)alkylmagnesium or di(C$_1$-C$_{20}$)arylmagnesium compounds, particularly di(n-butyl)magnesium, di(sec-butyl)magnesium, diisopropylmagnesium, di-n-hexylmagnesium, isopropyl-n-butyl-magnesium, ethyl-n-hexylmagnesium, ethyl-n-butylmagnesium, di-n-octylmagnesium, and combinations thereof. Exemplary suitable magnesium diaryls include diphenylmagnesium, dibenzylmagnesium and ditolylmagnesium. The organomagnesium compounds may optionally be treated with an organoaluminum compound for improving solubility, reducing solution viscosity, or both improving solubility and reducing solution viscosity. Stabilizers, such as stabilizers derived from substituted phenol compounds, may also be present. Additional suitable organomagnesium compounds include alkyl- and aryl-magnesium alkoxides, aryloxides and chlorides, as well as mixtures of the foregoing. Highly preferred organomagnesium compounds are the halogen-free organomagnesium compounds.

Chloride sources that can be employed in the preparation of the magnesium chloride component of the heterogeneous procatalysts include metallic chlorides and nonmetallic chlorides, including organochlorides and hydrogen chloride. Examples of metallic chlorides have a formula according to MR$_{y-a}$Cl$_a$, wherein: M is a metal of Group 13, 14, or 15 of the Periodic Table of Elements; R is a monovalent organic radical; y has a value equal to the valence of M, and has a value from 1 to y.

In various embodiments, the magnesium chloride component is made by chlorination of a solution of a hydrocarbon-soluble magnesium precursor to afford a MgCl$_2$ slurry in the same hydrocarbon solvent used for making the magnesium precursor solution.

In one or more embodiments, the heterogeneous procatalysts may be prepared by first preparing the magnesium chloride component (MgCl$_2$ component). The MgCl$_2$ component may be prepared by selecting an organomagnesium compound or a complex including an organomagnesium compound and reacting the organomagnesium compound with a chloride compound to make the MgCl$_2$ component. Examples of organomagnesium compounds and/or organomagnesium complexes may include, but are not limited to, magnesium C$_2$-C$_5$ alkyls and aryls, magnesium alkoxides and aryloxides, carboxylated magnesium alkoxides, and carboxylated magnesium aryloxides, or combinations of these. In some embodiments, the organomagnesium compound may include a magnesium C$_2$-C$_5$ alkyl, a magnesium C$_1$-C$_4$ alkoxides, or combinations of these. In some embodiments, the organomagnesium compound may be butyl ethyl magnesium.

To prepare the magnesium chloride component, the organomagnesium compound may be dispersed in the hydrocarbon diluent. The concentration of the organomegnesium compound in the hydrocarbon diluent may be sufficient that, when the metallic or non-metallic chloride compound and the organomagnesium compound are combined, the resultant slurry may include a concentration of magnesium of from 0.05 mol/L to 10.0 mol/L. The slurry of the organomagnesium compound dispersed in the hydrocarbon diluent may be contacted with the chloride compound to produce the MgCl$_2$. The chloride compound may be a metallic or non-metallic chloride. For example, in some embodiments, the chloride compound may be hydrochloride gas. In some embodiments, the slurry of organomagnesium compound and chloride compound may be contacted at a temperature from −25° C. to 100° C., or from 0° C. to 50° C. In some embodiments, the slurry of organomagnesium compound and metallic or non-metallic chloride may be contacted for a time from 1 hour to 12 hours, or from 4 hours to 6 hours.

The reaction of the metallic or non-metallic chloride with the organomagesium compound may produce the MgCl$_2$ component, which may be a MgCl$_2$ slurry that includes MgCl$_2$ particles dispersed in the hydrocarbon diluent. In some embodiments, the MgCl$_2$ slurry may have a concentration of MgCl$_2$ of from 0.05 mol/L to 10.0 mol/L, or from 0.2 mol/L to 1.0 mol/L, or from 0.1 mol/L to 0.3 mol/L.

In embodiments, processes for producing heterogeneous procatalysts include preparing a MgCl$_2$ slurry in a hydrocarbon solvent. The process further includes mixing the aluminum species into the MgCl$_2$ slurry. The aluminum species and MgCl$_2$ slurry mixture are heated, then the titanium species is added in the aluminum species and MgCl$_2$ slurry mixture, which is heated and stirred, and then washed is a hydrocarbon solvent to form the heterogeneous procatalyst.

In one or more embodiments, when preparing the magnesium chloride component or the heterogeneous procatalyst, the hydrocarbon solvent may be chosen from non-halogenated (C$_3$-C$_{30}$)alkyl or non-halogenated (C$_3$-C$_{30}$) cycloalkyl solvents. In some embodiments, the hydrocarbon solvent may include an isoparaffin solvent. Examples of ispoaraffin solvents may include, but are not limited to, ISOPAR™ synthetic paraffin solvents available from ExxonMobil (e.g., ISOPAR™ E paraffin solvent), and special boiling point (SBP) solvents by Shell Chemicals (e.g., SBP 100/140 high purity de-aromatized hydrocarbon solvent). Other examples of hydrocarbon solvents may include isobutene, pentane, isopentane, cyclopentane, hexane, 2-methylpentane, 3-methylpentane, cyclohexanes, methylcyclopentane, heptane, 2-methylhexane, 3-methylhexane, octane, 2,2,4-trimethylpentane, tetradecane, and combinations thereof.

In one or more embodiments of the catalyst system, the heterogeneous procatalyst is an unsupported bulk catalyst. In some embodiments, the heterogeneous procatalyst comprises heterogeneous procatalyst particles with a non-controlled morphology.

In some embodiments of the catalyst system, the heterogeneous procatalyst comprises particles with an average particle size from 0.1 micron to 10 microns. In one or more embodiments, the average particle size is less than or equal to 8 microns or is less than or equal to 6 microns. In various embodiments, the heterogeneous procatalyst includes heterogeneous procatalyst particles, in which greater than or equal to 10% of the particles have a particle size less than or equal to 1 micron and is measured by light scattering. In some embodiments, greater than or equal to 20%, greater than or equal to 30%, or greater than or equal to 40% of the particles have a particle size less than or equal to 1 micron.

In embodiments of the catalyst system, the hydrogenation procatalyst has the formula $Cp_2TiX_2$. In formula $Cp_2TiX_2$, each Cp is a cyclopentadienyl optionally substituted with at least one $R^1$, wherein $R^1$ is $(C_1-C_{10})$alkyl; and each X is independently $(C_1-C_{40})$hydrocarbon, $(C_1-C_{40})$heterohydrocarbon, $(C_1-C_{40})$hydrocarbyl, $(C_1-C_{40})$heterohydrocarbyl, or a halogen atom.

In one or more embodiments, each Cp is substituted with at least one $R^1$ chosen from methyl, ethyl, propyl, 2-propyl, n-butyl, tert-butyl, iso-butyl, n-pentyl, n-hexyl, n-heptyl, n-octyl, 2-ethylhexyl, tert-octyl, n-nonyl, or n-decyl. In one or more embodiments, the hydrogenation procatalyst is chosen from methylated-$Cp_2TiCl_2$, butylated-$Cp_2TiCl_2$, and ethylated-$Cp_2TiCl_2$.

In one or more embodiments, the hydrogenation procatalysts is chosen from bis(methylcyclopentadienyl)titanium chloride, bis(ethylcyclopentadienyl)titanium chloride, bis(butylcyclopentadienyl)titanium chloride.

In embodiments of the catalyst system, each X bonds with M through a covalent bond, a dative bond, or an ionic bond. In some embodiments, each X is identical. The metal-ligand complex has 6 or fewer metal-ligand bonds and can be overall charge-neutral or may have a positive-charge associated with the metal center. In some embodiments, the catalyst system includes a metal-ligand complex according to the formula, in which M is zirconium or hafnium; each X is independently chosen from $(C_1-C_{20})$alkyl, $(C_1-C_{20})$heteroalkyl, $(C_6-C_{20})$aryl, $(C_4-C_{20})$heteroaryl, $(C_4-C_{12})$diene, or a halogen. In one or more embodiments, each X is independently benzyl, phenyl, or chloro.

In some embodiments, the monodentate ligand may be a monoanionic ligand. Monoanionic ligands have a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, sulfate, $HC(O)O^-$, $HC(O)N(H)^-$, $(C_1-C_{40})$hydrocarbylC(O)O$^-$, $(C_1-C_{40})$hydrocarbylC(O)N($(C_1-C_{20})$hydrocarbyl)-, $(C_1-C_{40})$hydrocarbylC(O)N(H)$^-$, $R^KR^LB^-$, $R^KR^LN^-$, $R^KO^-$, $R^KS^-$, $R^KR^LP^-$, or $R^MR^KR^LSi^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In other embodiments, at least one monodentate ligand X, independently from any other ligands X, may be a neutral ligand. In specific embodiments, the neutral ligand is a neutral Lewis base group such as $R^QNR^KR^L$, $R^KOR^L$, $R^KSR^L$, or $R^QPR^KR^L$, where each $R^Q$ independently is hydrogen, $[(C_1-C_{10})$hydrocarbyl$]_3Si(C_1-C_{10})$hydrocarbyl, $(C_1-C_{40})$hydrocarbyl, $[(C_1-C_{10})$hydrocarbyl$]_3Si$, or $(C_1-C_{ao})$heterohydrocarbyl and each $R^K$ and $R^L$ independently is as previously defined.

Additionally, each X can be a monodentate ligand that, independently from any other ligands X, is a halogen, unsubstituted $(C_1-C_{20})$hydrocarbyl, unsubstituted $(C_1-C_{20})$hydrocarbylC(O)O—, or $R^KR^LN$—, wherein each of $R^K$ and $R^L$ independently is an unsubstituted $(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN$—, wherein each of $R^K$ and $R^L$ independently is an unsubstituted $(C_1-C_{10})$hydrocarbyl. In one or more embodiments, X is benzyl, chloro, $-CH_2SiMe_3$, or phenyl.

In further embodiments, each X is selected from methyl; ethyl; 1-propyl; 2-propyl; 1-butyl; 2,2-dimethylpropyl; trimethylsilylmethyl; phenyl; benzyl; or chloro. In some embodiments, each X is the same. In other embodiments, at least two X are different from each other. In the embodiments in which at least two X are different from at least one X, X is a different one of methyl; ethyl; 1-propyl; 2-propyl; 1-butyl; 2,2,-dimethylpropyl; trimethylsilylmethyl; phenyl; benzyl; and chloro. In further embodiments, the bidentate ligand is 2,2-dimethyl-2-silapropane-1,3-diyl or 1,3-butadiene.

In some embodiments, in formula $Cp_2TiX_2$, each X is a substituted benzyl or substituted heteroarylbenzyl. In other embodiments, X is selected from the group consisting of:

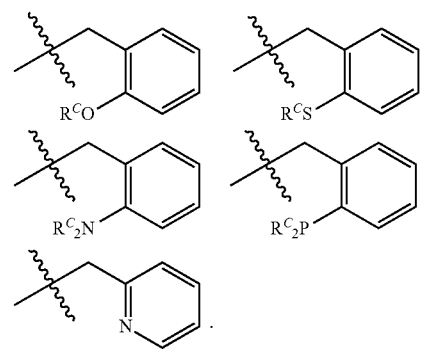

Cocatalyst Component

In some embodiments, the catalysts system may further include a co-catalysts. The heterogeneous procatalyst according to this disclosure may be combined with a cocatalyst to form a Zeigler-Natta catalyst. The Zeigler-Natta catalyst comprising the heterogeneous procatalyst may be rendered catalytically active by any technique known in the art for activating Zeigler-Natta type procatalysts of olefin polymerization reactions. Without intent to be limited, in one example, the heterogeneous procatalyst may be rendered catalytically active by contacting the procatalyst to, or combining the procatalyst with, an activating cocatalyst. Suitable activating cocatalysts for use herein include alkyl aluminums, including polymeric or oligomeric alumoxanes (also known as aluminoxanes). Combinations of one or more of the foregoing activating cocatalysts are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane. In some embodiments, the cocatalyst may be chosen from an alkyl of aluminum, a haloalkyl of aluminum, an alkylaluminum halide, and mixtures thereof. In some embodiments, the cocatalyst may be chosen from triethylaluminum, trimethylaluminum, tri-n-butylaluminum, triisobutylaluminum, tri-n-hexylaluminum, tri-n-octylaluminum, diethylaluminum chloride, MAO, MMAO, diethylaluminum ethoxide, and mixtures thereof.

Preparation of the Catalyst System

In one or more embodiments, the catalyst system is prepared by mixing the heterogeneous procatalyst, hydrogenation procatalyst, and optionally, a cocatalyst in a hydrocarbon solvent. The catalyst system may then be used in the polymerization process.

In some embodiment, the catalyst system is prepared by feeding each of the heterogeneous procatalyst, hydrogenation procatalyst and the cocatalyst into a reactor via separate feed lines and allowing at least two of the heterogeneous procatalyst, hydrogenation procatalyst and the cocatalyst to mix for 0.5 minutes to 60 minutes at ambient temperature before adding the third component to the reactor.

In other embodiments, the catalyst system is prepared by feeding each of the heterogeneous procatalyst, hydrogenation procatalyst and the cocatalyst into a reactor via separate feed lines and allowing the catalyst system to mix for 0.5 minutes to 60 minutes at ambient temperature before adding the third component to the reactor.

Embodiments of this disclosure include polymerization processes. The polymerization process for producing polyolefin polymers includes reacting one or more α-olefin monomers in solution in the presence of a catalyst system of this disclosure, in which the catalyst system includes a heterogeneous procatalyst and a hydrogenation procatalyst as previously disclosed.

In one or more embodiments of the polymerization process, the one or more α-olefin may be $(C_2-C_{12})$α-olefins. In some embodiments, there is only a single type of olefin, ethylene, in the polymerization process. In some embodiments, more than one $(C_2-C_{12})$α-olefin monomers may be incorporated into the polymerization process. In various embodiments, the $(C_2-C_{12})$α-olefin monomers include, but are not limited to, ethylene, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or from the group consisting of 1-hexene and 1-octene.

In one or more embodiments of the polymerization process, $(C_2-C_{12})$α-olefins are reacted in solution in a reactor at a reaction temperature from 150° C. to 350° C.

Embodiments of the polymerization processes include, but are not limited to, solution polymerization processes using one or more conventional reactors such as loop reactors, isothermal reactors, stirred tank reactors, batch reactors in parallel, series, or any combinations thereof, for example. In one embodiment, the polymerization process may include solution polymerization in a dual reactor system, for example a dual loop reactor system, wherein ethylene and, optionally, one or more α-olefins are polymerized in the presence of the catalyst system, as described herein, and optionally one or more cocatalysts. The catalyst system, as described herein, may be present in the first reactor or in the second reactor, optionally in combination with one or more other catalysts. In one embodiment, an ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the polymerization process may include a solution polymerization in a single-reactor system, for example a single loop reactor system or a single stirred tank reactor system, in which ethylene and optionally one or more α-olefins are polymerized in the presence of the catalyst system, as described within this disclosure, optionally one or more cocatalysts, as described in the preceding paragraphs and optionally in combination with one or more other catalysts.

Test Methods

Specific surface area of $MgCl_2$ support is measured by Brunauer, Emmett, Teller (BET) Surface Area Method. A Tristar 3020 Surface Area Analyzer by Micromeritics is used. A amount of 30 mL of $MgCl_2$ slurry is filtered to remove solvent and then re-slurried in 30 mL of hexane. The resulting slurry is filtered again under inert atmosphere and washed with additional hexane. This process is repeated once to yield a filter cake of $MgCl_2$. Residual solvent is removed from the filter cake under vacuum. The filter cake is further dried on a Vac Prep 061 by Micromeritics using a 0.5 inch (1.27 cm) sample tube and a Transeal stopper designed for inert sample protection by loading a 0.2 g sample of the vacuum-dried $MgCl_2$ into the tube under inert atmosphere with a Transeal stopper. The sample tube is connected to the Vac Prep 061 unit with nitrogen purging. The sample tube is treated with vacuum by opening the Transeal stopper and the evacuated tube is placed in a heating block with an aluminum tube protector. The sample is dried under the vacuum on the Vac Prep 061 unit at 110° C. for 3 hours. Afterward, nitrogen is introduced into sample tube. The dried sample is allowed to cool to room temperature before disconnecting the sample tube from the Vac Prep 061 unit to give a fully dried sample. Under inert atmosphere, 0.1500 g to 0.2000 g of the fully dried sample is transferred into a clean sample tube with a tube filler rod. The sample tube is then sealed with a Transeal stopper and connected to the Tristar 3020 instrument for surface area measurement. QUICKSTART method is used for acquiring data.

Melt index (MI), or I2, is measured in accordance with ASTM D 1238-10, Condition 190° C./2.16 kg, Procedure B, and is reported in grams eluted per 10 minutes (g/10 min).

Samples for density measurements were prepared according to ASTM D 4703-10. Samples were pressed at 374° F. (190° C.), for five minutes, at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements were made within one hour of sample pressing using ASTM D792-08, Method B.

Magnesium chloride particle size was determined with a Malvern Mastersizer 3000 laser particle size analyzer. The Mastersizer 3000 is calibrated with a wet standard (silica beads of D50=60 micron) ran through the Hydro MV cell using Malvern's QAS3001B Quality Audit Standard (bottle part number CRM0016). The sample cell is cleaned prior to use via stirring of 140 mL of isopropanol at 3500 RPM for 5 minutes followed by reduction of stirring to 1000 RPM, decanting of the isopropanol, and repeating two times. The sample cell is then loaded with 140 mL of mineral oil in preparation to receive the sample. The sample is prepared in an inert atmosphere glovebox by adding 0.12 mL of a 0.2 mol/L slurry into a pre-dried GC vial. Subsequently a 0.75 mL addition of mineral oil is added to the GC vial, vortexed to mix, and then the entire contents are added to the sample cell of the dispersion unit. Light scattering is performed with the refractive index of MgCl2 (1.68) entered into the software. The instrument is initialized and the background is measured. Next the light scattering of the sample is conducted and D10, D50, and D90 are reported by the software.

For gel permeation chromatography (GPC), the chromatographic system consisted of a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 g/mol to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad (EQ1)$$

where M is the molecular weight, A has a value of 0.4315 and B is equal to 1.0.

A fifth order polynomial was used to fit the respective polyethylene-equivalent calibration points. A small adjustment to A (from approximately 0.405 to 0.440) was made to correct for column resolution and band-broadening effects such that NIST standard NBS 1475 is obtained at 52,000 Mw.

The total plate count of the GPC column set was performed with decane (prepared at 0.04 g in 50 milliliters of TCB.) The plate count (Equation 2) and symmetry (Equation 3) were measured on a 200 microliter injection according to the following equations:

$$\text{Plate Count} = 5.54 * \left( \frac{RV_{Peak\ Max}}{\text{Peak Width at } \frac{1}{2} \text{ height}} \right)^2 \quad (EQ2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ Max})}{(RV_{Peak\ max} - \text{Front Peak } RV_{one\ tenth\ height})} \quad (EQ3)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of Mn, Mw, and Mz were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i).

$$Mn = \frac{\Sigma^i IR_i}{\Sigma^i (IR_i / M_{polyethylene_i})} \quad (EQ\ 4)$$

$$Mw = \frac{\Sigma^i (IR_i * M_{polyethylene_i})}{\Sigma^i IR_i} \quad (EQ\ 5)$$

$$Mz = \frac{\Sigma^i (IR_i * M_{polyethylene_i}^2)}{\Sigma^i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−2% of the nominal flowrate.

$$\text{Flowrate(effective)} = \text{Flowrate(nominal)} * (RV(FM\ Calibrated)/RV(FM\ Sample)) \quad (EQ7)$$

Solution Batch Reactor Copolymerization Test Method.

Batch reactor is charged with 250 g of 1-octene and 1330 g of Isopar E. Heat reactor contents to 190° C., then saturate contents with ethylene in presence of specified amount of molecular hydrogen ($H_2$). A suspension of procatalyst (e.g., PCAT in liquid (e.g., (C1)), cocatalyst triethylaluminum (TEA), and alkylated $Cp_2TiCl_2$ solution (e.g., E1 or E2) is mixed, if needed, in a separate flask, and immediately the resulting mixture is added into the batch reactor. The pressure in the reactor is maintained at 3100 kilopascals (kPa; equal to 450 pounds per square inch (psi)) with ethylene flow to compensate for pressure drop due to ethylene consumption during polymerization thereof. After 10 minutes reaction time, bottom valve is appended and reactor contents are transferred into a glass kettle. The contents of kettle are poured onto a Mylar lined tray and allowed to cool. The contents are placed on a tray in fume hood overnight to allow most of the liquid to evaporate. The remaining resin is dried in a vacuum oven to give a product poly(ethylene-co-1-octene) copolymer.

Continuous Solution Reactor Copolymerization Test Method.

The continuous solution polymerization process includes a adiabatic, continuous stirred tank reactor (CSTR). The reactor included independent control of all solvent, monomer, comonomer, hydrogen, and catalyst system component feeds. The total feed stream to the reactor, which includes the solvent, monomer, comonomer, and hydrogen, is temperature controlled by passing the total feed stream through a heat exchanger before introducing the total feed stream to the reactor. The total feed stream to the reactor is injected into the reactor at one location. The catalyst system components are injected into the reactor separate from the other feeds. An agitator in the reactor is used to continuously mix the reactants. An oil bath provides additional fine tuning of the reactor temperature control.

The ethylene monomer, 1-octene comonomer, and process solvent (SBP 100/140 by Shell Chemicals) are purified with molecular sieves before introduction into the reactor. The feed streams of monomer solvent and comonomer are pressurized via to a pressure greater than the reaction pressure. The monomer, comonomer, solvent, and hydrogen streams are combined and, then, introduced to the reactor. The individual components of the catalyst system are manually batch diluted with purified solvent/diluent and pressurized to a pressure greater than the reaction pressure. The feed lines for procatalyst (PCAT), cocatalyst, and alkylated $Cp_2TiCl_2$ hydrogenation procatalyst (if used) are merged into a single line and the components are mixed with each other for about 2 minutes before entering into the reactor. All reaction feed flows are measured with mass flow meters and independently controlled with metering pumps.

The final reactor effluent is passed to a zone where the catalyst system is deactivated with the addition of and reaction with water. Following catalyst deactivation, the reactor effluent is passed to a two stage de-volatization system where the ethylene-based polymer is removed from the non-polymer stream (e.g., excess monomer or comonomer, solvent, etc.). The non-polymer stream is removed from the system, and the isolated polymer melt is pelletized and collected.

EXAMPLES

The following examples are provided to illustrate embodiments described in this disclosure and are not intended to limit the scope of this disclosure or its appended claims.

Procatalyst Preparation

Compound (C1). Isopar E fluid containing >99.75% to 99.9% by weight naphtha (petroleum), light alkylate, CAS 64741-66-8, and 0.1% to <0.25% by weight isooctane CAS 540-54-1, (isoalkanes mixture) obtained from ExxonMobil Corporation and having a boiling range of 114° C. to 139° C.

Particulate $MgCl_2$ (D1). Solid particulate $MgCl_2$ having a BET surface area of 375 $m^2/g$ to 425 $m^2/g$. Product was prepared by diluting a 20 wt % solution of butylethylmagnesium in heptane into a measured quantity of (C1) to give a diluted solution; adding hydrogen chloride (HCl) slowly to the diluted solution with agitation at 30° C. until the molar ratio of $C_1$ to Mg reaches 2.04:1.00 while maintaining the temperature at 30 f 3° C., to give a 0.20 mol/L suspension of (D1) in (C1).

Preparation of Heterogeneous Procatalyst ("PCAT")

A 15% by weight ethylaluminum dichloride (EADC) solution in heptane is slowly added to the aforementioned $MgCl_2$ particulate slurry (D1) at 30° C. with agitation until the EADC/Mg ratio reaches 0.3. The temperature of the reaction mixture is maintained at 30 f 3° C. during the addition. The mixture is allowed to age at 30° C. for 4 hours. Subsequently, a 51 wt % titanium(IV) isopropoxide solution in heptane is slowly added to the mixture at 30° C. with agitation until the Ti/Mg ratio reaches 0.075. The temperature of the reaction mixture is maintained at 30±3° C. during the addition. The mixture is allowed to age at 30° C. for at least 8 hours. Isopar E solvent (C1) is used for rinsing for ensuring the accuracy of the catalyst formulation. The final Ti concentration for the finished procatalyst is 0.12 mol/L.

Preparation of the Hydrogenation Procatalyst

Example 1: Bis(ethylcyclopentadienyl)titanium chloride (E1). Place 1.000 g of $Cp_2TiCl_2$ and a stir bar in a 2 ounce bottle. Slowly add 20.1 mL of 1.0 mol/L triethylaluminum (TEA) solution in heptane over about 10 minutes with stirring. The solid $Cp_2TiCl_2$ becomes soluble and forms a blue solution.

Example 2: Bis(butylcyclopentadienyl)titanium chloride (E2). Place 0.544 g of $Cp_2TiCl_2$, 4.0 mL of Isopar E and a stir bar in a 4 ounce bottle. Slowly add 38.0 mL of 1.0 M triisobutylaluminum (TiBAl) solution in hexanes over about 10 minutes with stirring. The solid $Cp_2TiCl_2$ becomes soluble and forms a blue solution.

Example 3: Bis(ethylcyclopentadienyl)titanium chloride (E3). Place 50.00 g of $Cp_2TiCl_2$ and a stir bar in a 1 liter bottle. Add 880 mL of 1.0 M triethylaluminum (TEA) solution in heptane over about 10 minutes with stirring. The solid $Cp_2TiCl_2$ becomes soluble and forms a blue solution.

Polymerization of ethylene and one or more α-olefin, such as 1-octene, was conducted in the presence of different amounts of $H_2$ for establishing a relationship between (1) polymer weight average molecular weight (Mw) and $H_2$ amount; (2) Mw/Mn and Mw; and (3) Mz/Mw and Mw, and the characteristics of the resulting polymeric and catalyst systems were recorded in Tables 1-4.

TABLE 1

Solution Batch Reactor Copolymerization Results for Comparative Examples: Baselines without Hydrogenation Procatalyst

| Run # | Procatalyst Loading (μmol Ti) | TEA/Ti (mol/mol) | $Cp_2TiCl_2$/ Ti (mol/mol) | $H_2$ (mmol) | Mw (g/mol) | Mw/ Mn | Mz/ Mw |
|---|---|---|---|---|---|---|---|
| CE1 | 2 | 10 | 0 | 40 | 109,356 | 3.76 | 3.08 |
| CE2 | 2 | 10 | 0 | 30 | 119,829 | 4.04 | 3.13 |
| CE3 | 2 | 10 | 0 | 20 | 142,982 | 4.36 | 3.26 |
| CE4 | 2 | 10 | 0 | 10 | 166,293 | 4.84 | 3.32 |
| CE5 | 2 | 10 | 0 | 5 | 177,386 | 4.68 | 3.41 |

*Catalyst efficiency is calculated from the amount of ethylene consumed during polymerization per gram of Ti in the magnesium halide-supported titanium procatalyst (kilograms of ethylene per milligram of Ti); TEA is triethylaluminum; the D50 particle size of the heterogeneous procatalyst was less than 10 microns.

As recorded in Table 1, the molecular weight, molecular weight distribution, and the Mz/Mw all increased for the polymer produced in systems including the comparative catalysts as the amount of hydrogen was decreased.

TABLE 2

Solution Batch Reactor Copolymerization Results: Hydrogenation Procatalyst E2

| Run # | Procatalyst Loading (μmol Ti) | TEA/Ti (mol/mol) | $Cp_2TiCl_2$/Ti (mol/mol) | $H_2$ (mmol) | Catalyst Efficiency (kg/mg Ti) | Mw (g/mol) | Mw/Mn | Mz/Mw |
|---|---|---|---|---|---|---|---|---|
| IE1 | 4 | 10 | 1 | 40 | 0.24 | 126,210 | 3.86 | 3.12 |
| IE2 | 4 | 10 | 2 | 40 | 0.17 | 156,914 | 4.03 | 3.07 |
| IE3 | 4 | 10 | 3 | 40 | 0.14 | 179,154 | 4.35 | 2.97 |
| IE4 | 4 | 10 | 4 | 40 | 0.14 | 188,420 | 4.32 | 3.03 |

Ethylene polymerization reactions were carried out in the presence of 40 mmol of $H_2$ in the presence of a butylated $Cp_2TiCl_2$ hydrogenation procatalyst (E2). The data in Table 2 indicates that a substantial portion of $H_2$ may be consumed by the hydrogenation catalyst. The amount of $H_2$ consumed is evident from the weight average molecular weight of the produced polymer. For example, the catalyst system in Run IE3 included a hydrogenation procatalyst with a 3:1 molar ratio of $Cp_2TiCl_2$/Ti in the presence of 40 mmol of $H_2$, and the weight average molecular weight of the produced polymer is 179,154 g/mol. With 40 mmol of $H_2$ in the reactor system, the catalyst system of Run IE3 produced a polymer with a weight average molecular weight approximately 70,000 g/mol greater than the weight average molecular weight of the polymer produced in Run CE5 (Table 1) by a comparative catalyst system in the presence of 40 mmol of $H_2$.

The comparative catalyst system lacked the hydrogenation procatalyst. As the amount of $H_2$ increased, the weight average molecular weight decreased. In contrast, in the examples in Tables 2 and 3, in the presence of 40 mmol of $H_2$ weight average molecular weights of the produced polymers increased as the amount of hydrogenation procatalyst increased. This trend supports the assertion that a substantial portion of $H_2$ can be consumed by the hydrogenation catalysts. In addition, although the molecular weight distribution slightly increased as weight average molecular weight of the polymer increased, the magnitude of the increase was significantly less than that of the increases observed without a hydrogenation procatalyst (Table 1).

TABLE 3

Solution Batch Reactor Copolymerization Results: Hydrogenation Proatalyst E1

| Run # | Procatalyst Loading (μmol Ti) | TEA/Ti (mol/mol) | $Cp_2TiCl_2$/Ti (mol/mol) | $H_2$ (mmol) | Catalyst Efficiency (kg/mg Ti) | Mw (g/mol) | Mw/Mn | Mz/Mw |
|---|---|---|---|---|---|---|---|---|
| IE5 | 4 | 0 | 1 | 40 | 0.30 | 119,727 | 4.10 | 3.17 |
| IE6 | 4 | 0 | 2 | 40 | 0.16 | 146,702 | 4.24 | 3.17 |
| IE7 | 4 | 0 | 3 | 40 | 0.15 | 153,402 | 4.17 | 3.07 |
| IE8 | 4 | 0 | 4 | 40 | 0.09 | 148,078 | 4.18 | 2.94 |

Ethylene polymerization reactions were carried out in the presence of 40 mmol of $H_2$ and an ethylated $Cp_2TiCl_2$ hydrogenation procatalyst (E1). The data in Table 3 also indicates that a substantial portion of $H_2$ can be consumed by the hydrogenation catalyst. In particular, with a constant amount of added $H_2$, as the ratio of hydrogenation procatalyst to titanium catalyst was increased from 1:1: to 4:1, the weight average molecular weights of the polymers also generally increased. The increase in weight average molecular weight of the polymers evidences hydrogen consumption by the hydrogenation catalyst because the presence of $H_2$ can terminate the polymer chain.

TABLE 4

Continuous Solution Reactor Copolymerization Results: Hydrogenation Procatalyst E3

| | Example | |
|---|---|---|
| Polymerization Conditions | CE6 | IE9 |
| Feed Temperature (° C.) | 20° C. | 20° C. |
| Solvent/Ethylene Mass Flow Ratio (g/g) | 7 | 7 |
| 1-Octene/Ethylene Mass Flow Ratio (g/g) | 0.10 | 0.10 |
| Hydrogen/Ethylene Mass Flow Ratio (g/g) | $3.52 \times 10^{-5}$ | $3.52 \times 10^{-5}$ |
| Reactor Temperature (° C.) | 195° C. | 195° C. |
| Reactor Pressure (kPa) | 3102 kPa | 3102 kPa |
| Hydrogenation Procatalyst | None | E3 |
| $Cp_2TiCh_2$/Ti in PCAT (mol/mol) | 0 | 0.92 |
| TEA/Ti (mol/mol) | 5.0 | 5.3 |
| Properties of Ethylene-Based Polymer | | |
| Density (g/cm³) | 0.9411 | 0.9395 |
| Melt Index (g/10 min) | 1.20 | 0.33 |
| Mw (by GPC) (Daltons) | 118,247 | 152,883 |
| Mw/Mn | 4.09 | 4.14 |
| Mz/Mw | 3.53 | 3.37 |

In the continuous reaction process, the catalyst system of Run IE9, including both the hydrogenation procatalyst E3 and the heterogeneous catalyst, produced a polymer having a molecular weight almost 30% greater than that of a polymer produced by a catalyst system without the hydrogenation catalyst. The polymer produced by the catalyst system containing the hydrogenation procatalyst E3 and the heterogeneous catalysts had an equivalent molecular weight distribution and an Mz/Mw less than the corresponding values of the polymer produced by the comparative catalyst system in Run CE6, as shown in the FIGURE. The hydrogenation procatalyst, E3, is able to build in specific regions of molecular weight (around Mw) without influencing the distributions (or Mn or Mz).

The invention claimed is:
1. A catalyst system comprising:
   a heterogeneous procatalyst comprising a titanium species, an aluminum species, and a magnesium chloride component, wherein the heterogeneous procatalyst comprises heterogeneous procatalyst particles having an average particle size from 0.1 micron to 10 microns; and a hydrogenation procatalyst having the formula $Cp_2TiX_2TiCp_2$ or $Cp_2TiX_n$ where:
  each Cp is cyclopentadienyl substituted with at least one $(C_1-C_{10})$alkyl;
  each X is independently monoanionic or neutral, wherein each X is independently $(C_1-C_{40})$ hydrocarbon, $(C_1-C_{40})$ heterohydrocarbon, $(C_1-C_{40})$ hydrocarbyl, $(C_1-C_{40})$ heterohydrocarbyl, or a halogen atom; and
  n is 1 or 2.

2. The catalyst system of claim 1, wherein the heterogeneous procatalyst is an unsupported bulk catalyst.

3. The catalyst system of claim 1, wherein the heterogeneous procatalyst comprises heterogeneous procatalyst particles with a non-controlled morphology.

4. The catalyst system of claim 1, wherein the heterogeneous procatalyst comprises heterogeneous procatalyst particles, wherein greater than or equal to 10% of the heterogeneous procatalyst particles have a particle size less than or equal to 1 micron.

5. The catalyst system of claim 1, wherein the ratio of moles titanium in the hydrogenation procatalyst to moles titanium in the heterogeneous procatalyst is greater than 1:2.

6. The catalyst system of claim 1, further comprising an alkyl aluminum cocatalyst $Al(R^2)_3$, where each $R^2$ is independently $(C_1-C_{20})$alkyl or halogen atom, provided at least one $R^2$ is $(C_1-C_{20})$alkyl.

7. The catalyst system of claim 1, further comprising an alkyl aluminum cocatalyst selected from the group consisting of trialkylaluminum compounds, dialkylaluminum chlorides, alkylaluminum dichlorides, alkylaluminum alkoxides, and alkylaluminoxanes.

8. The catalyst system claim 6, wherein the ratio of moles titanium in the heterogeneous procatalyst to moles aluminum in the alkyl aluminum cocatalyst is greater than 2:1.

9. The catalyst system of claim 6, wherein the ratio of moles titanium in the heterogeneous procatalyst to moles aluminum in the alkyl aluminum cocatalyst is from 1000:1 to 2:1.

10. A polymerization process comprising:
reacting $(C_2-C_{12})$ α-olefins in solution in the presence of a catalyst system, the catalyst system comprising:
  a heterogeneous procatalyst comprising a titanium species, an aluminum species, and a magnesium chloride component, wherein the heterogeneous procatalyst comprises heterogeneous procatalyst particles having an average particle size from 0.1 micron to 10 microns; and
  a hydrogenation procatalyst having the formula $Cp_2TiX_nTiCp_2$ or $Cp_2TiX_n$
  where:
    each Cp is cyclopentadienyl substituted with at least one $(C_1-C_{10})$alkyl;
    each X is independently monoanionic or neutral, wherein each X is independently $(C_1-C_{40})$ hydrocarbon, $(C_1-C_{40})$ heterohydrocarbon, $(C_1-C_{40})$ hydrocarbyl, $(C_1-C_{40})$ heterohydrocarbyl, or a halogen atom; and n is 1 or 2.

11. The polymerization process of claim 10, wherein the catalyst system further comprises a trialkylaluminum cocatalyst $Al(R^2)_3$, where each $R^2$ is independently $(C_1-C_{20})$ alkyl.

12. The polymerization process of claim 10, wherein the heterogeneous procatalyst is an unsupported bulk catalyst.

13. The polymerization process of claim 10, wherein the heterogeneous procatalyst comprises heterogeneous procatalyst particles, wherein greater than or equal to 10% of the particles have a particle size less than or equal to 1 micron.

14. The polymerization process of claim 10, wherein the heterogeneous procatalyst comprises heterogeneous procatalyst particles with a non-controlled particle morphology.

15. The polymerization process of claim 10, wherein the $(C_2-C_{12})$ α-olefins in solution are reacted in a reactor at a reaction temperature from 150° C. to 350° C.

* * * * *